(12) United States Patent
Salonidis et al.

(10) Patent No.: US 12,117,975 B2
(45) Date of Patent: *Oct. 15, 2024

(54) LINKING, DEPLOYING, AND EXECUTING DISTRIBUTED ANALYTICS WITH DISTRIBUTED DATASETS

(71) Applicant: INTERNATIONAL BUSINESS MACHINES CORPORATION, Armonk, NY (US)

(72) Inventors: Theodoros Salonidis, Wayne, PA (US); Bong Jun Ko, Harrington Park, NJ (US); Swati Rallapalli, Ossining, NY (US); Rahul Urgaonkar, Rye, NY (US); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/469,104

(22) Filed: Sep. 8, 2021

(65) Prior Publication Data

US 2021/0406227 A1    Dec. 30, 2021

Related U.S. Application Data

(63) Continuation of application No. 14/980,733, filed on Dec. 28, 2015, now Pat. No. 11,163,732.

(51) Int. Cl.
*G06F 16/21* (2019.01)
*G06F 16/23* (2019.01)
(Continued)

(52) U.S. Cl.
CPC ............ *G06F 16/211* (2019.01); *G06F 16/23* (2019.01); *G06F 16/951* (2019.01);
(Continued)

(58) Field of Classification Search
CPC ...... G06F 16/211; G06F 16/955; G06F 16/23; G06F 16/951; G06Q 10/063
(Continued)

(56) References Cited

U.S. PATENT DOCUMENTS 9,020,868 B2    4/2015  Elkins et al.
9,686,086 B1 *  6/2017  Nguyen ................. G06F 16/23
(Continued)

OTHER PUBLICATIONS

List of IBM Patents or Patent Applications Treated as Related dated Sep. 8, 2021, 2 pages.

(Continued)

*Primary Examiner* — Hosain T Alam
*Assistant Examiner* — Saba Ahmed
(74) *Attorney, Agent, or Firm* — Tutunjian & Bitetto, P.C.; Samuel Waldbaum

(57) ABSTRACT

Methods and systems for execution of distributed analytics include building a global linked structure that describes correspondences between dataset metadata structures, analytics metadata structures, and location metadata structures and that encodes compatibility between respective datasets, analytics, and locations. A set of analytics and compatible datasets for execution is determined based on the dataset metadata structures, analytics metadata structures, and global linked structure. An optimal execution location is determined based on the determined set of analytics and compatible datasets, the location metadata structures, and the global linked structure. The set of analytics and compatible datasets are deployed to the optimal location for execution.

20 Claims, 7 Drawing Sheets

(51) Int. Cl.
 *G06F 16/951* (2019.01)
 *G06F 16/9538* (2019.01)
 *G06F 16/955* (2019.01)
 *G06Q 10/063* (2023.01)

(52) U.S. Cl.
 CPC ........ *G06F 16/9538* (2019.01); *G06F 16/955* (2019.01); *G06Q 10/063* (2013.01)

(58) Field of Classification Search
 USPC .......................................................... 707/803
 See application file for complete search history.

(56) References Cited

U.S. PATENT DOCUMENTS

| | | | |
|---|---|---|---|
| 10,140,366 B2* | 11/2018 | Platt ...................... | G06F 16/634 |
| 2013/0007063 A1* | 1/2013 | Kalra ..................... | G06F 16/972 |
| | | | 707/E17.005 |
| 2013/0166490 A1 | 6/2013 | Elkins et al. | |
| 2014/0280338 A1 | 9/2014 | Metz et al. | |
| 2015/0081883 A1 | 3/2015 | Katz et al. | |
| 2015/0227521 A1* | 8/2015 | Levari ................... | G06F 16/278 |
| | | | 707/694 |
| 2015/0278335 A1* | 10/2015 | Opitz .................... | G06F 16/283 |
| | | | 707/602 |
| 2016/0062694 A1* | 3/2016 | Makkar ................ | G06F 3/0629 |
| | | | 711/111 |

OTHER PUBLICATIONS

Ruggiero, W., A Distributed Data and Control Driven Machine: Programming and Architecture, An IP.com Prior Art Database Technical Disclosure, IP.com Electronic Publication: Apr. 19, 2007.
Disclosed Anonymously, Method and system for deploying and executing Java applications on z/OS using standard partitioned and sequential datasets, An IP.com Prior Art Database Technical Disclosure, IP.com Electronic Publication: Apr. 30, 2012.
Paolo Bellavista et al., Priority-based Resource Scheduling in Distributed Stream Processing Systems for Big Data Applications, in Utility and Cloud Computing (UCC), 2014 IEEE/ACM 7th International Conference, pp. 363-370, Dec. 8-11, 2014.

* cited by examiner

LINKING, DEPLOYING, AND EXECUTING DISTRIBUTED ANALYTICS WITH DISTRIBUTED DATASETS

BACKGROUND

Technical Field

The present invention relates to parallel processing and, in particular, to linking, distributing, and executing analytics on datasets in a distributed computing platform.

Description of the Related Art

In traditional analytic platforms, analytics are executed on datasets in centralized environments, either on-premises or in remote datacenters. Recent advances in distributed computing have enabled parallel analytic computations on distributed datasets by deploying analytics at the locations where the datasets reside. Other distributed analytics platforms, such as stream analytics, operate on continuous data sources, either by bringing the data to a central location for processing or by deploying operators to locations where the data are generated.

A common restriction imposed by existing distributed analytic platforms is that analytic computations and the locations of the datasets they will operate on need to be known in advance. For example, a user who needs to perform regression analysis on vehicular mobility datasets may manually find the location of such datasets using a search engine, download the datasets, and then use an analytics package that runs on an existing analytics platform that performs linear regression using the format supported by the datasets. However, there is no available solution for discovering matching datasets and analytics automatically, nor for determining how to efficiently execute the analytics on the datasets in distributed physical network locations. The existing solutions do not address the problem of performing this matching and cannot optimize the execution of the analytics considering their inter-dependencies and common usage of system resources.

SUMMARY

A method for execution of distributed analytics includes building a global linked structure that describes correspondences between dataset metadata structures, analytics metadata structures, and location metadata structures and that encodes compatibility between respective datasets, analytics, and locations. A set of analytics and compatible datasets for execution is determined based on the dataset metadata structures, analytics metadata structures, and global linked structure. An optimal execution location is determined based on the determined set of analytics and compatible datasets, the location metadata structures, and the global linked structure. The set of analytics and compatible datasets are deployed to the optimal location for execution.

A method for execution of distributed analytics includes creating dataset metadata structures that characterize one or more datasets comprising known types of analytics that may be applied to a respective dataset. Analytics metadata structures that characterize one or more analytics are created and include known types of dataset that may be used by a respective analytic. Location metadata structures are created that characterize one or more execution locations by the physical and computing resources available at each respective location. A global linked structure is built that includes correspondences between the dataset metadata structures, analytics metadata structures, and location metadata structures and that encodes compatibility between respective datasets, analytics, and locations. A set of analytics and compatible datasets for execution is determined based on the dataset metadata structures, analytics metadata structures, and global linked structure. An optimal execution location is determined based on the determined set of analytics and compatible datasets, the location metadata structures, and the global linked structure. The set of analytics and compatible datasets are deployed to the optimal location for execution.

A system for data analytics deployment includes a processor configured to build a global linked structure that includes correspondences between dataset metadata structures, analytics metadata structures, and location metadata structures and that encodes compatibility between respective datasets, analytics, and locations, to determine a set of analytics and compatible datasets for execution based on the dataset metadata structures, analytics metadata structures, and global linked structure, and to determine an optimal execution location based on the determined set of analytics and compatible datasets, the location metadata structures, and the global linked structure. A deployment module is configured to deploy the set of analytics and compatible datasets to the optimal location for execution.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide a system where datasets and analytics are not known a priori but are instead dynamically generated in multiple physical network locations. Analytics and datasets are individually created by publishers, potentially without exact knowledge of their future usage, and are potentially inter-dependent, such that a given analytic may use multiple datasets and a given dataset may be used by multiple analytics.

Examples of analytics that may be employed within the framework of the present invention include, for example, map reduce functions, which perform analytics in parallel across distributed datasets, and stream processing, which deploy applications for processing streaming data. As conventionally deployed, both of these analytics assume advance knowledge of data source/dataset locations and the data operations to be performed on them.

The present embodiments provide linking, distribution, and efficient execution of analytics on datasets in a computing platform. It is specifically contemplated that the computing platform is a distributed solution, for example a cloud computing system, with physical network locations that may be far apart. The present embodiments use metadata structures to characterize analytics, datasets, and physical computing locations. A global linked data structure is used to link these types of metadata together in terms of compatibility and execution cost. A set of analytics and their compatible datasets can then be selected, either manually by visualizing the linked data structure, or by running a user query on a desired type of computation and dataset, and then executed in the selected physical locations that provide optimal execution cost. Execution may be implemented by packaging the analytics and datasets using container technologies and using the placement primitives of these container technologies to perform the deployment and execution of the analytics in the selected physical network locations.

The present embodiments thereby enable discovery and optimized deployment of matching analytics on datasets at distributed physical locations. Compatible analytics and datasets are matched with optimal execution locations using queries on their respective metadata. Placement and movement of both analytics and data is optimized subject to their sharing of system resources and their interdependence. All of this is accomplished without the need for a manual search of matching analytics and datasets.

Figure 1:
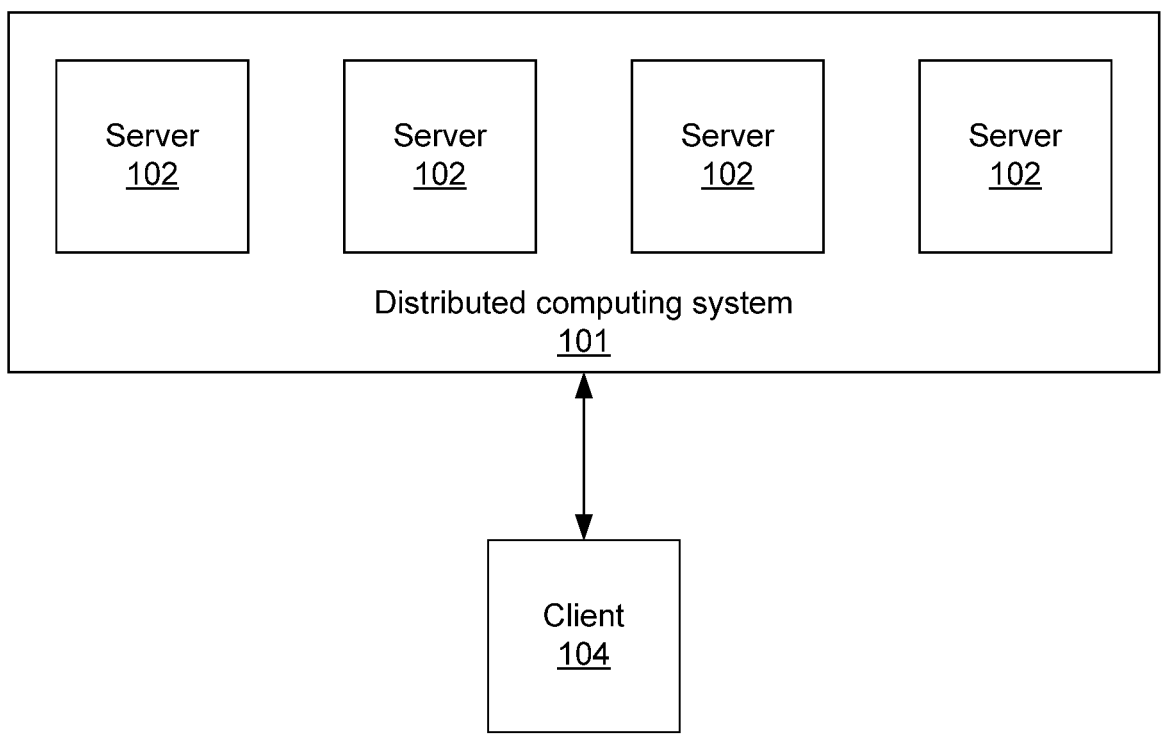
FIG. 1 is a block diagram of a distributed computing system in accordance with the present principles.

Referring now to the drawings in which like numerals represent the same or similar elements and initially to FIG. 1, a distributed computing system 101 is shown. In the system 101, multiple servers 102 form the computing environment. As will be described in greater detail below, these servers 102 may be distributed geographically, and each server 102 may have a different set of available analytics and datasets. A client 104 requests that a particular analytic be performed on a particular dataset at a particular server 102. To accomplish this, the client tracks metadata for each of the analytics, datasets, and servers 102 and automatically optimizes a match between the three.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

It should be recognized that the client 104 may be a user device or may, alternatively, be a control module that directly interfaces with the distributed computing system. In one particular embodiment, a user sends only an abstract request or query for an analytic to be performed, and the client 104 transparently translates that query into specific commands for the distributed computing system 101, including packaging analytics and/or datasets into a form that can be readily executed by an assigned server 102.

In general, each analytic and dataset is generated at an initial physical location and its ultimate place of use may not be known in advance. In addition, analytics and datasets share the distributed computing system's resources (e.g., processor time, memory, storage, network resources) across multiple physical locations and servers 102. To perform an analytic operation on a dataset, the analytic operation and the dataset both need to be deployed at the same server 102 for efficient processing.

Figure 2:
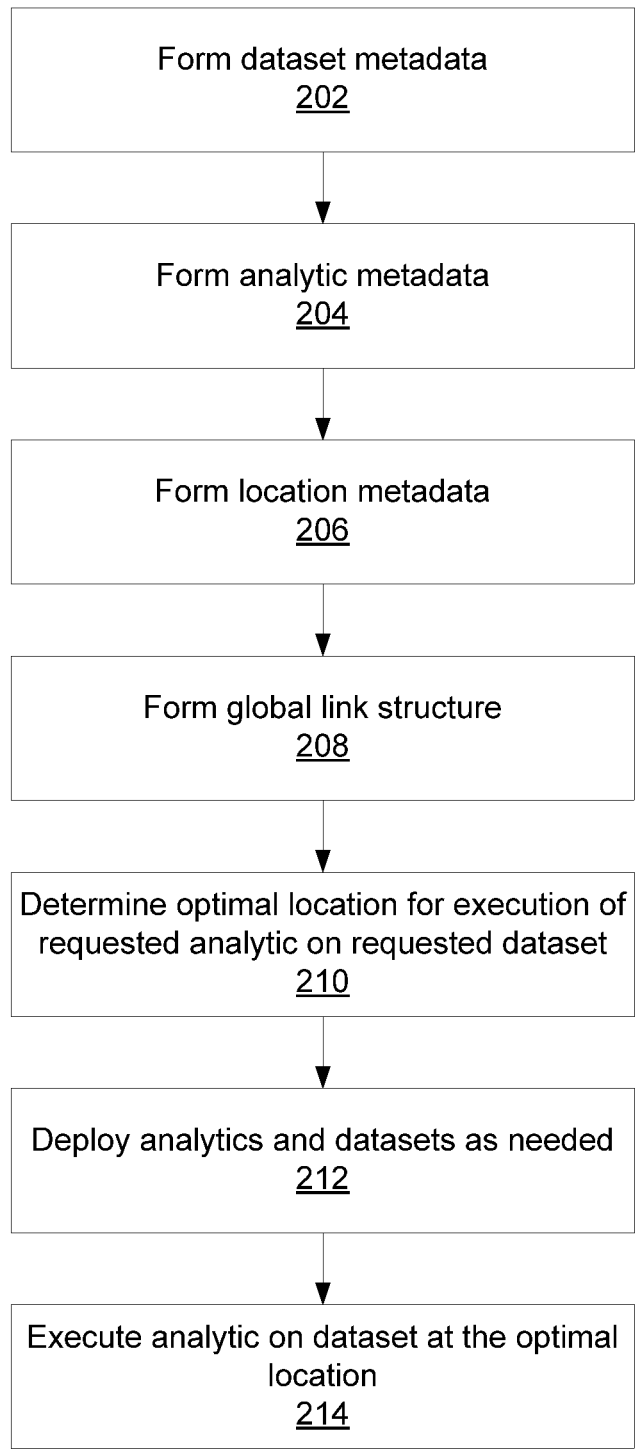
FIG. 2 is a block/flow diagram of a method for deploying and executing requested analytics and datasets in a distributed computing system in accordance with the present principles.

Referring now to FIG. 2, a method of executing an analytic is shown. It should be noted that this method shows the overall system and it should be understood that the various steps may be performed by a single actor or by multiple actors, working in concert or independently. In particular, it is contemplated that some or all of the metadata may be supplied by a publisher of, e.g., an analytic or dataset as described below.

Block 202 forms dataset metadata. As noted above, each of the analytics, the datasets, and the servers 104 are characterized by metadata. The dataset metadata structure may contain structured components and unstructured components. Examples of structured components include, e.g., global identifiers, titles, type of data stored, supported data formats, date of creation, date of modification, version number, publisher, known types of analytics that may be applied to the dataset, etc. The dataset metadata may also include policies that define access rights and operations applicable to the dataset. Dataset metadata may also include unstructured components such as, e.g., a text-based description. This description may be used to extract initial types of analytics that may be performed on the dataset or to discover keywords related to the type of data in the dataset. Dataset metadata may further include links to physical locations where copies of the dataset are stored (e.g., to the specific servers 102). Links to similar or related datasets may also be stored, as well as links to compatible analytics. Compatibility is determined in terms of matching types of data and computations, data formats, or access rules defined by policies on the dataset.

Block 204 forms analytic metadata. Analytics metadata may also include structured and unstructured components. Examples of structured analytics components include, e.g., global identifiers, titles, type of supported computations, supported input and output formats, date of creation, date of modification, version number, publisher, currently known types of datasets that have been used with the analytics, etc. Analytics metadata may also include unstructured components such as, e.g., a text based description. The description can be used to extract initial types of, and links to, datasets that can be executed by the analytic, or to discover keywords and patterns related to the type of computations enabled by the analytics package. Compatibility is determined in terms of matching types of data and computations, data format, or access rules as defined by policies on the analytics. Analytics metadata may include links to physical locations where copies of the analytic are stored. The analytics metadata may also include links to other analytics that can be used in conjunction with the described analytic, as well as links to datasets that are compatible with the analytic and can be executed by it.

In one exemplary embodiment, initial metadata for the datasets and analytics are created in blocks 202 and 204 by their respective publishers. The initial metadata structure includes static components and certain links of the global data structure (for example, the results of an initial discovery based on the static components and the links to the physical location where the analytic or dataset has been generated).

Block 206 forms metadata for a given server 102 or physical location. Server metadata may include a description of local computing resources (e.g., quantifying processing, memory, storage, and network capacities) and restrictions on certain types of analytics and datasets that can be stored or executed, as expressed by a set of policy rules. Server metadata may also include links to the analytics and datasets hosted at the corresponding location.

Some components of the metadata structures that are static or local are created upon creation of their respective analytics and datasets. Other components, such as the links to other analytics, datasets, and servers 102, may be created or updated dynamically during system operation.

Block 208 forms a global link structure. The global link data structure includes links between datasets, analytics, and servers 102 through the link portions of their metadata structure. It should be understood that links to servers 102 may represent links to specific devices or, alternatively, may refer to a set of collocated computing resources. Such links can be formed proactively upon dataset or analytic creation by first creating their local metadata components and then encapsulating and sending the metadata in a query that seeks to match metadata of analytics and datasets that reside in other physical locations.

In one exemplary embodiment, the global link data structure is updated based on user queries. A user issues a query that is decomposed into an analytic part and a dataset part and is run jointly on the metadata structures of existing analytics and datasets. For example, consider a query for "linear regression on vehicular mobility traces." This query is decomposed to a computation part and a dataset part. These parts are matched with the metadata structures of existing analytic packages and datasets, thus updating the global linked data structure. The query returns a set of analytic packages that perform linear regression and datasets that include vehicular mobility traces, along with their physical locations. In addition, the query result may also output the cost of executing the analytics in a distributed cloud. The user selects analytics and datasets from the presented lists for execution. Then, using the global link data structure, the selected analytics and datasets are deployed and executed at the determined locations at minimum cost.

Links of the global data structure can also be formed in a reactive manner, arising as a result of user queries which seek to perform certain types of computations on certain types of datasets. In this case, the users of the system issue queries which express a request to perform computations on data based on the system's analytics and datasets. These queries may be either in unstructured form (e.g., text) or structured form (e.g., a query language or constructed through pull-down menus). In both cases, the query can be decomposed into an analytic component and a dataset component. These two components are used to search physical locations for matching analytics and datasets and link together these analytics and datasets as well as their physical locations.

Links in the global link data structure between analytics and datasets can be formed if certain predetermined compatibility conditions are satisfied. These compatibility conditions pertain to matching types of data and computations, data format, access rules (as defined by policies on the datasets), analytics, and physical locations or the resource constraints of the physical locations. These compatibility conditions between analytics and data may be constructed a priori by inspecting the metadata headers or may be created on the fly by observing which data types and formats are executed by certain types of analytics.

Block 210 determines an optimal server 102 or physical location for the execution of a requested analytic on a requested dataset. The metadata and global link data structures are used by the block 210 to decide which servers 102 should be used to deploy and execute a selected set of compatible analytics and datasets. Each selected set can be determined either manually, by inspecting the global link data structure, or automatically, by a user query which defines a composite computation request on data in the system. The optimal servers 102 are determined by associating costs with the links in the global data linking analytics, datasets, and servers 102. A cost between an analytic and a dataset at a specific server 102 or physical location captures the cost of transferring, storing, and executing the analytic and dataset at that location. The optimization decision takes into account the interdependence of datasets and analytics and pertinent physical resources and access constraints. In one embodiment, where one analytic is located at server location A and one compatible dataset is at server location B, the optimization will either move the analytic to location B or the dataset to location A, depending on which action will yield lower transfer, storage, and execution cost subject to the resource and access constraints of storing and executing the analytic and dataset on each server. In another embodiment, the optimization will move both the analytics and the dataset to a third location C as it will yield better performance. In yet another embodiment, with multiple interconnected analytics, datasets and server locations, it is possible to perform the optimization by solving an optimization problem that places analytics and datasets in locations so that an aggregate cost metric is minimized subject to the server resource and access constraints and the information about analytics, datasets and physical location encoded in the global linked data structure.

Block 212 deploys the analytics and datasets to the optimal server 102 or servers as needed, noting that a given analytic or dataset may already be present at a given location. Deployment can be implemented by packaging analytics and datasets along with their metadata structures using a container technology and then using built-in deployment primitives (e.g., migration or replication) to deploy the packaged analytics and datasets in the optimal locations. Block 214 then executes the analytics, for example by using execution primitives of the container technology.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
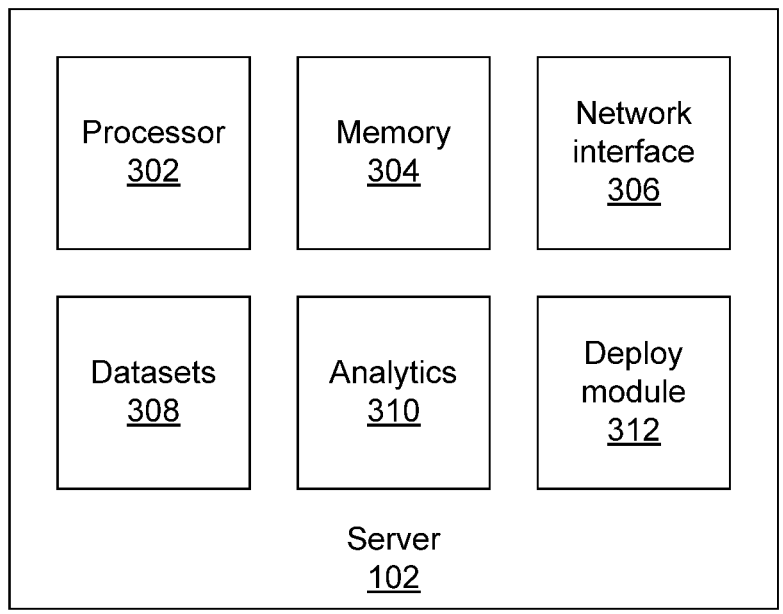
FIG. 3 is a block diagram of a server device in accordance with the present principles.

Referring now to FIG. 3, a diagram of a server 102 is shown. As noted above, the server 102 may be a discrete physical device or, alternatively, may represent one or more collocated devices at a same geographical location. The server 102 includes at least one hardware processor 302 and memory 304 and a network interface 306. The server 102 further stores in memory 304 datasets 308 and analytics 310 that can be performed on the datasets 308 using the processor 302. The server 102 may further include deployment module 312, which receives deployment packages from a client 104 that may include datasets 308 and/or analytics 310 along with instructions for execution of the same. It should be noted that the deployment module 312 may be implemented as software that is stored in memory 304 and executed by processor 302 or may, alternatively, be implemented as a discrete hardware unit in the form of, for example, an application specific integrated chip or field-programmable gate array.

Figure 4:
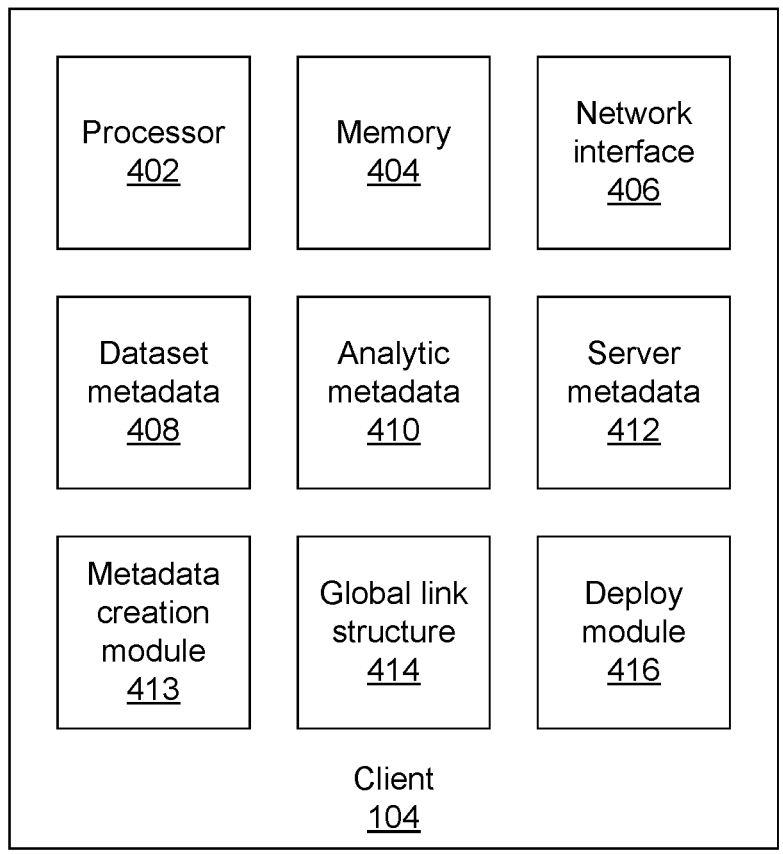
FIG. 4 is a block diagram of a client device in accordance with the present principles.

Referring now to FIG. 4, a diagram of client 104 is shown. As noted above, the client 104 may be implemented on a user device or may, alternatively, be directly in communication with, or a part of, the distributed computing system 101. The client 104 includes a hardware processor 402 and memory 404, as well as a network interface 406. The client stores dataset metadata 408, analytic metadata 410, and server metadata 412 as described above, and includes a global link structure that identifies correspondences between each type of metadata. The respective metadata may be created and updated by a metadata creation module 413 or may, alternatively, be supplied by a third party such as the publisher of a dataset or analytic.

A deploy module 416 packages analytics and datasets together for deployment to a server 102, including instructions for execution of the same. It should be noted that the deployment module 416 may be implemented as software that is stored in memory 404 and executed by processor 402 or may, alternatively, be implemented as a discrete hardware unit in the form of, for example, an application specific integrated chip or field-programmable gate array.

Figure 5:
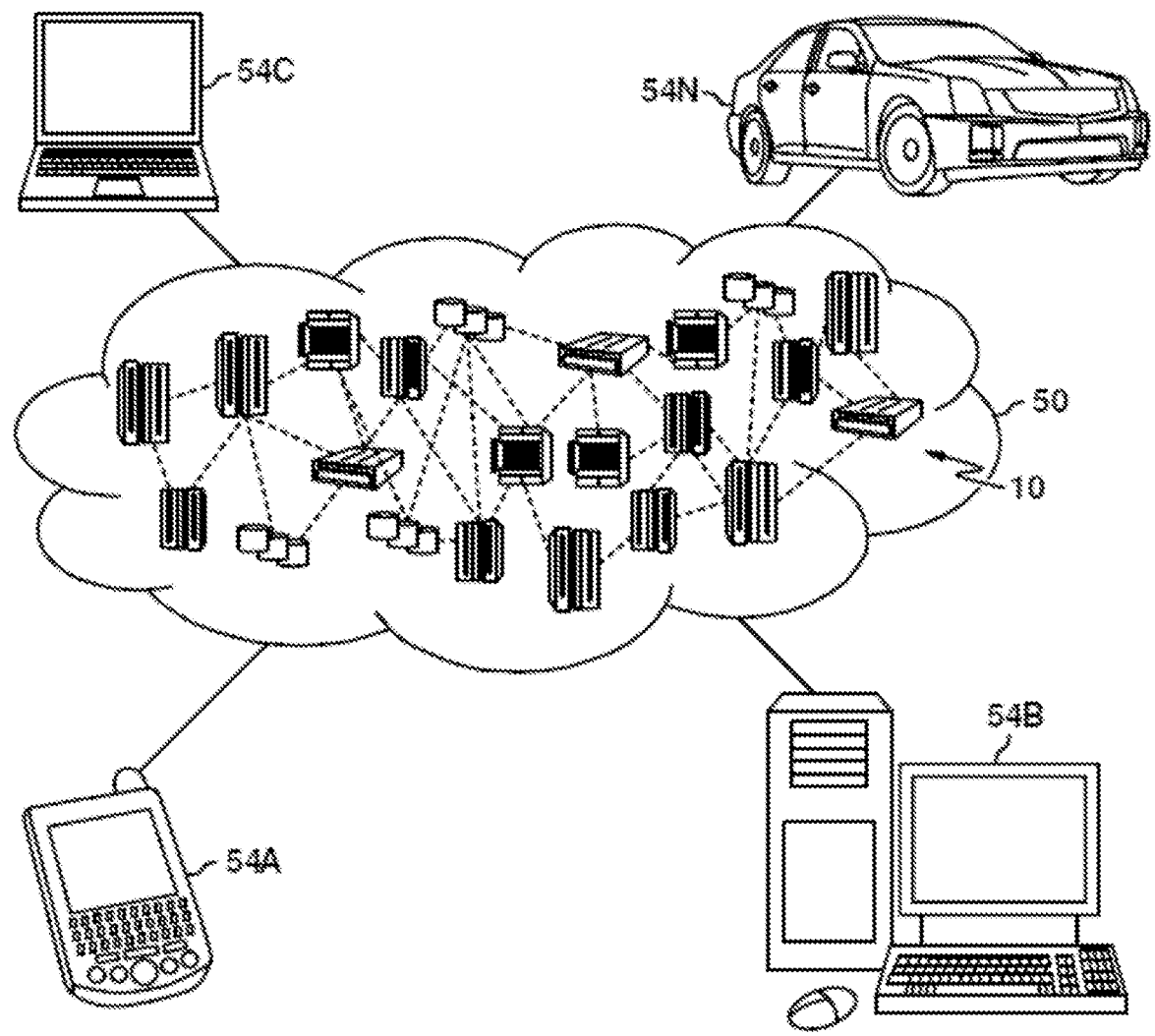
FIG. 5 is a diagram of a cloud computing environment according to the present principles.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
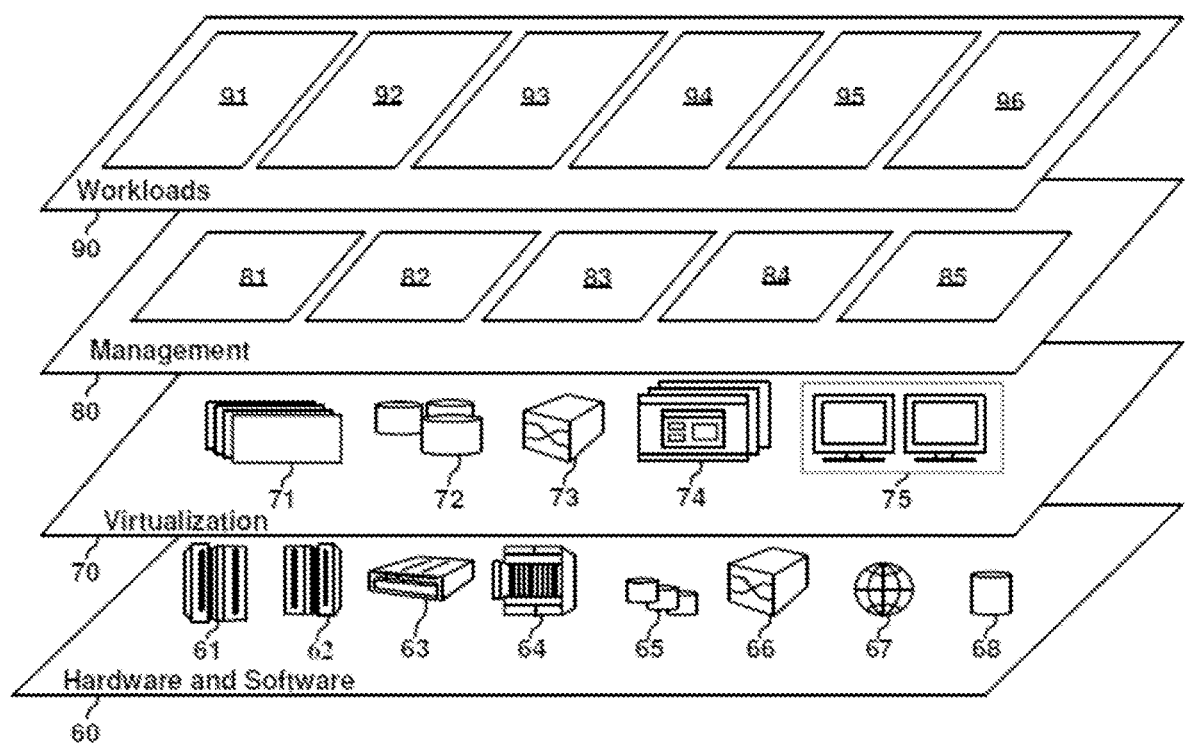
FIG. 6 is a diagram of abstraction model layers according to the present principles.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data analytics 96.

Figure 7:
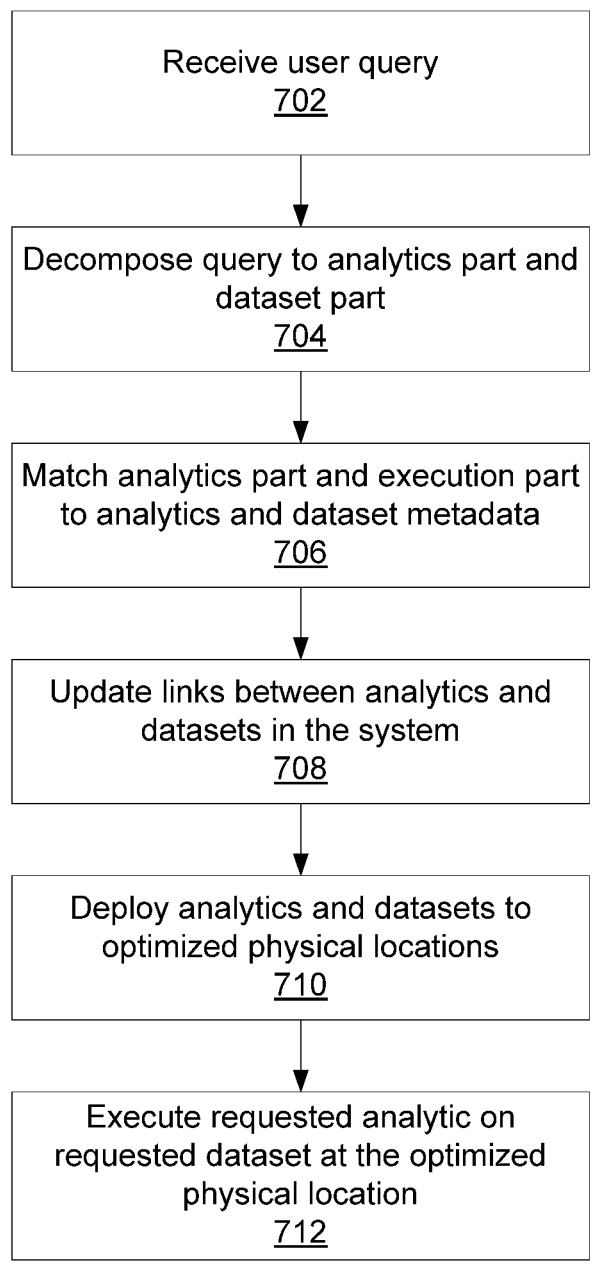
FIG. 7 is a block/flow diagram of a method for deploying and executing requested analytics and datasets in a distributed computing system in accordance with the present principles.

Referring now to FIG. 7, a method of executing a query is shown. This method presupposes the existence of a set of analytics, dataset, and server metadata. Block 702 receives a user query that specifies, e.g., an analytic and a dataset. Block 704 decomposes the query into an analytics part and a dataset part. Block 706 matches the analytics part of the query and the dataset part of the query to respective analytics and dataset metadata.

Block 708 updates links between analytics and datasets in the system by updating the metadata of the respective analytics and datasets to reflect any changes (e.g., copying or deletion of analytics or datasets between the servers 102) that may have occurred since the execution of the last query. The update is performed because matching the analytics and dataset parts may discover new links that were not previously part of the global link data structure, and block 708 updates the data structure accordingly. Block 710 then deploys analytics and datasets to optimized physical locations based on the match between analytics and datasets and their respective metadata. Block 712 executes the query at the optimized physical location.

Figure 8:
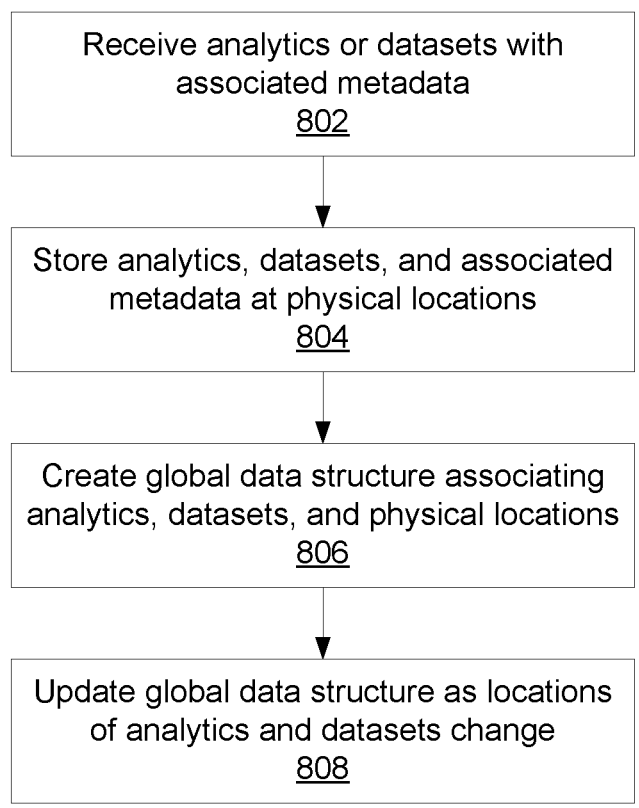
FIG. 8 is a block/flow diagram of a method for building a global linking data structure in accordance with the present principles.

Referring now to FIG. 8, a method for creating a global linking data structure is shown. Block 802 receives analytics and/or datasets from publishers along with their respective metadata. Block 804 stores the analytics and datasets with their associated metadata at one or more physical locations (e.g., servers 102) within the system 101. Block 806 creates the global linking data structure based on the locations of the analytics and datasets and further based on their associated metadata, identifying the relationships between them and their physical locations within the system 101. As locations of the analytics and datasets change (e.g., from addition, deletion, or movement of analytics and datasets within the system 101), block 808 updates the global linking data structure to reflect these changes.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for execution of distributed analytics, comprising:
   building a global linked structure that includes correspondences between, and links together, dataset metadata structures that characterize one or more datasets, analytics metadata structures that characterize one or more analytics, and location metadata structures that characterize a plurality of physical computing locations of a distributed computing network and include information defining resources of the plurality of physical computing locations, the global linked structure encoding compatibility between respective datasets, analytics, and locations, including a condition that matches types of data, analytics, and resource constraints of physical location;
   determining a set of analytics and a set of compatible datasets compatible with the set of analytics based on the dataset metadata structures, analytics metadata structures, and global linked structure;
   determining an optimal execution location from a plurality of physical computing locations in a distributed computing network for execution of the set of analytics on the set of compatible datasets based on costs that are determined based on the location metadata structures, and the global linked structure; and
   deploying the sets of analytics and compatible datasets to the optimal execution location.

2. The method of claim 1, further comprising creating the dataset metadata structures that characterize one or more datasets or creating the analytics metadata structures that characterize one or more analytics, wherein the dataset metadata structures or the analytics metadata structures each respectively comprises structured and unstructured components.

3. The method of claim 2, wherein creating the dataset metadata structures is performed responsive to publication of the one or more datasets or submission of a user's query.

4. The method of claim 2, wherein creating the analytics metadata structures is performed responsive to publication of the one or more analytics or submission of user's query.

5. The method of claim 1, wherein the dataset metadata structures comprise known types of analytics that may be applied to a respective dataset.

6. The method of claim 1, further comprising executing the deployed set of analytics on the set of compatible datasets at the optimal execution location to perform a data processing task with an optimal performance.

7. The method of claim 1, wherein the global linked structure links datasets, analytics, and physical computing locations through link portions of their respective dataset metadata structures, analytics metadata structures, and location metadata structures.

8. The method of claim 1, wherein the analytics metadata structures comprise known types of dataset that may be used by a respective analytic.

9. The method of claim 1, further comprising creating the location metadata structures that characterize one or more execution locations.

10. The method of claim 1, wherein the location metadata structures comprise information defining available physical and computing resources at the plurality of locations and a set of links to analytics and datasets.

11. A computer readable storage medium comprising a computer readable program for data analytics deployment, wherein the computer readable program when executed on a computer causes the computer to perform the steps of:
    building a global linked structure that includes correspondences between, and links together, dataset metadata structures that characterize one or more datasets, analytics metadata structures that characterize one or more analytics, and location metadata structures that characterize a plurality of physical computing locations of a distributed computing network and include information defining resources of the plurality of physical computing locations, the global linked structure encoding compatibility between respective datasets, analytics, and locations, including a condition that matches types of data, analytics, and resource constraints of physical location;
    determining a set of analytics and compatible datasets compatible with the set of analytics based on the dataset metadata structures, analytics metadata structures, and global linked structure;
    determining an optimal execution location from a plurality of physical computing locations in a distributed computing network for execution of the set of analytics on the set of compatible datasets based on costs that are determined based on the location metadata structures, and the global linked structure; and
    deploying the sets of analytics and compatible datasets to the optimal execution location.

12. A system for data analytics deployment, comprising:
    a distributed computing network including a plurality of physical computing locations; and
    at least one processor device operatively coupled to a memory and configured;
      to build a global linked structure that includes correspondences between and links dataset metadata structures that characterize one or more datasets, analytics metadata structures that characterize one or more analytics, and location metadata structures that characterize the plurality of physical computing locations and including information defining resources of the plurality of physical computing locations, the global linked structure encoding compatibility between respective datasets, analytics, and locations, including a condition that matches types of data, analytics, and resource constraints of physical location,
      to determine a set of analytics and a set of compatible datasets compatible with the set of analytics based on the dataset metadata structures, analytics metadata structures, and global linked structure;
      to determine an optimal execution location from the plurality of physical computing locations for execution of the set of analytics on the set of compatible datasets based on costs that are determined based on the location metadata structures, and the global linked structure; and to deploy the sets of analytics and compatible datasets to the optimal execution location.

13. The system of claim 12, wherein the at least one processor device is further configured to create the dataset metadata structures that characterize one or more datasets and comprise structured and unstructured components.

14. The system of claim 13, wherein the at least one processor device is further configured to create said dataset metadata structures responsive to publication of the one or more datasets or submission of a user's query.

15. The system of claim 12, wherein the dataset metadata structures comprise known types of analytics that may be applied to a respective dataset.

16. The system of claim 12, wherein the at least one processor device is further configured to create the analytics metadata structures that characterize one or more analytics and comprise structured and unstructured components.

17. The system of claim 16, wherein the at least one processor device is further configured to create said analytics metadata structures responsive to publication of the one or more analytics or submission of a user's query.

18. The system of claim 12, wherein the at least one processor device is further configured to create the location metadata structures that characterize one or more execution locations.

19. The system of claim 12, wherein the location metadata structures comprise information defining available physical and computing resources at the plurality of computing locations and a set of links to analytics and datasets.

20. The method of claim 1, wherein deploying includes packaging analytics and datasets along with their metadata structures using a container.

* * * * *